(12) United States Patent
Jonsson et al.

(10) Patent No.: US 6,672,616 B2
(45) Date of Patent: Jan. 6, 2004

(54) AIR BAG INFLATOR

(75) Inventors: Jan Jonsson, Savedalen (SE); Dan Ericsson, Boras (SE)

(73) Assignee: Autoliv Development, Vårgårda (SE)

( * ) Notice: Subject to any disclaimer, the term of this patent is extended or adjusted under 35 U.S.C. 154(b) by 0 days.

(21) Appl. No.: 10/097,122

(22) Filed: Mar. 14, 2002

(65) Prior Publication Data

US 2002/0130502 A1 Sep. 19, 2002

(30) Foreign Application Priority Data

Mar. 15, 2001 (GB) .............................. 0106471

(51) Int. Cl.[7] .............................................. B60R 21/26
(52) U.S. Cl. .................... 280/737; 280/741; 137/68.13; 137/68.3
(58) Field of Search ................................ 280/737, 736, 280/741, 742; 137/68.13, 68.3, 62.29

(56) References Cited

U.S. PATENT DOCUMENTS

| | | | |
|---|---|---|---|
| 4,298,214 A | * | 11/1981 | Brown, Jr. .................. 280/741 |
| 5,301,978 A | | 4/1994 | Münzel et al. |
| 5,582,806 A | | 12/1996 | Skanberg et al. |
| 5,593,180 A | | 1/1997 | Cuevas et al. |
| 5,746,442 A | * | 5/1998 | Hoyaukin .................... 280/737 |
| 5,820,161 A | | 10/1998 | Svensson |
| 6,247,725 B1 | * | 6/2001 | Moller ........................ 280/737 |

FOREIGN PATENT DOCUMENTS

JP 09058394 A * 3/1997 ........... B60R/21/26

* cited by examiner

*Primary Examiner*—Peter C. English
(74) *Attorney, Agent, or Firm*—Venable LLP; Robert Kinberg; Jung Kim

(57) ABSTRACT

An inflator for an air-bag has two gas chambers mounted on a central block (1). The central block defines passages leading from the gas chambers to the air-bag, but the passages are initially sealed by closures. An ignitor mounted on the block can generate hot gas to move an actuating element in a predetermined direction, the actuating element having a conical face which acts on inclined faces of two opening elements which are thus moved apart to rupture the closures to permit gas to flow from the chambers into the air-bag. Finally gas from the ignitor can also flow through a passage into the air-bag to ignite the mixed gases from the two gas chambers.

12 Claims, 2 Drawing Sheets

AIR BAG INFLATOR

CROSS REFERENCE TO RELATED APPLICATION

This application claims the priority of British Application No. 0106471.6 filed Mar. 15, 2001.

BACKGROUND OF THE INVENTION

The present invention relates to an inflator, and more particularly relates to an inflator for an air-bag intended for use in a motor vehicle such as a motor car.

It has been proposed previously to provide an air-bag mounted in a motor vehicle, the air-bag being adapted to be inflated in the event that an accident should occur so that the air-bag, when inflated, is located in front of the occupant of the vehicle to provide protection for the occupant of the vehicle.

Various techniques have been used to prevent injuries being caused by the impact between the air-bag and the occupant of a seat, which can happen if the airbag inflates very abruptly or very aggressively. For example, it has been proposed to provide venting holes or valves associated with the air-bag so that high pressure gas may be vented from the interior of the air-bag. Alternatively it has been proposed that the air-bag may be inflated in two or more stages following an impact situation.

A recently developed two-stage inflation technique uses a gas mixture containing mainly inert gas and a small amount of flammable gas. The gas is introduced into the air-bag, thus commencing inflation of the air-bag, and finally the flammable gas is ignited, with a result that the total gas content within the air-bag expands, inflating the air-bag to a desired final pressure.

To prevent the unintentional premature ignition of the flammable gas, it has been proposed that an oxidisable gas, such as a fuel gas, should be stored in one gas chamber, and a gas such as oxygen, should be stored in a separate gas chamber. It is only when gas from the two chambers has been introduced into the interior of the air-bag, and mixed, that the flammable gas exists.

U.S. Pat. No. 5,820,161 discloses an arrangement of this type.

For an air-bag of this type to operate in a satisfactory manner, both of the gas chambers must be opened simultaneously, and the resultant gas mixture in the airbag must be ignited after a specified time delay. Non-simultaneous opening of the chambers and/or a time delay of an inappropriate time period, may lead to incomplete combustion, delayed ignition, or in a worse case, no ignition at all of the gas mixture.

The present invention seeks to provide an improved inflator.

SUMMARY OF THE INVENTION

According to this invention there is provided an inflator for an air-bag, the inflator comprising a first gas chamber for containing a first gas, and second gas chamber for containing a second gas, each gas chamber being mounted on a central block or housing, the central block or housing defining gas flow passages leading from each gas chamber to direct gas to an air-bag. Each passage is initially closed by a closure, the housing containing an opening element associated with each closure, adapted to move from an initial position in which integrity of the closure is maintained to a final position in which the closure is opened. There is an igniter to generate hot gas, and an actuating element adapted to be moved in response to the generation of the hot gas, means being provided to constrain the actuating element to move in a predetermined direction over at least part of its movement. The actuating element acts upon the opening elements to move the opening elements substantially simultaneously to open the closure elements to permit (1) gas to flow from the gas chambers through the gas ducts, (2) movement of the actuating element and the opening elements over a predetermined distance, and (3) opening a further gas flow path to permit gas from the igniter to flow through the gas ducts.

In operation of an embodiment of the invention the gas from the ignitor, when it has flowed through the said gas ducts, will ignite the mixed first and second gases.

Preferably the central block or housing defines two passages, each passage extending from a central part of the block or housing, to a respective closure, each passage containing a respective opening element, the actuating element being adapted, on movement in response to the generation of hot gas, to engage and act on part of each opening element to cause the opening elements to move substantially simultaneously to open the closures.

Conveniently each opening element comprises a head defining an end face and wherein the actuating element includes surfaces adapted to engage with said end faces, either the end faces or the surfaces, or both the end faces and the surfaces, being inclined with respect to the axes of the passages to provide a wedging effect.

Preferably the head of each opening element is provided with an inclined planar face, and the actuating element is of substantially conical form.

Conveniently the conical surface of the actuating element is provided with a plurality of cut-outs.

Advantageously the actuating element is provided with an axially extending skirt, the axially extending skirt initially being received in an annular passage, the skirt and the annular passage co-operating to constrain the actuating element to move in said predetermined direction.

Preferably a separate respective gas flow duct is provided extending from each said passage to form a gas flow path from the passage to the interior of the airbag.

Advantageously the first gas chamber contains an oxidisable gas, alone or in admixture with an inert gas, and wherein the second gas chamber contains an oxidising gas, alone or in combination with an inert gas. The oxidisable gas may be methane, ethane, propane, acetylene, hydrogen or mixtures thereof. The oxidising gas may be oxygen or an oxide of nitrogen. The inert gas may be argon or helium or a mixture thereof.

Conveniently each closure is in the form of a breakable foil.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
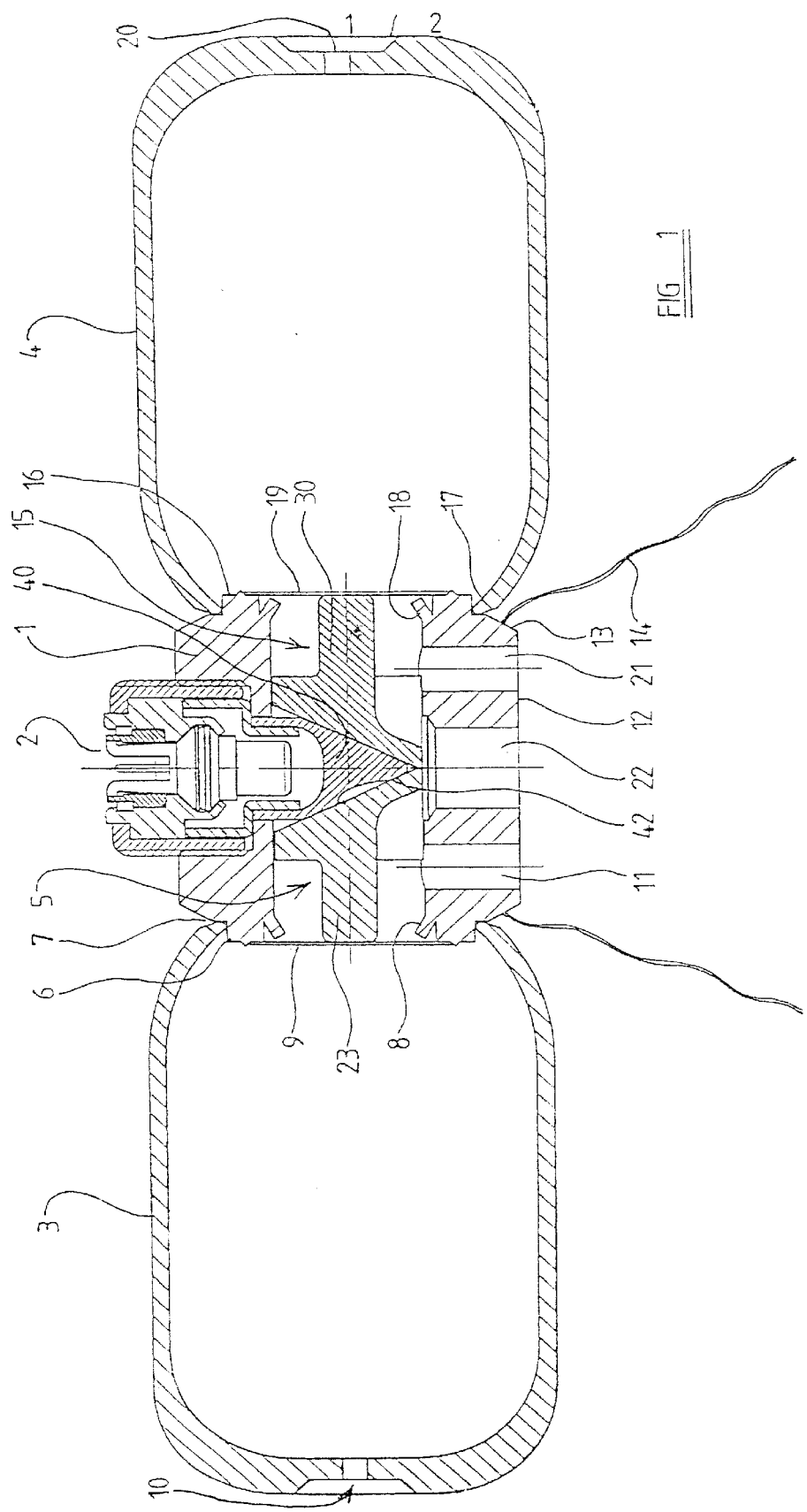
FIG. 1 is a diagrammatic sectional view of an inflator in accordance with the invention.

Referring initially to FIG. 1, an inflator, for an air-bag, comprises a central housing or mounting block 1 which is provided with an electronically activated igniter 2, and on which is mounted a first gas chamber 3 adapted to contain a fuel gas or oxidisable gas, such as hydrogen, which may be admixed with an inert gas, and a second gas chamber 4 adapted to contain an oxidising gas, such as oxygen, which again may be mixed with an inert gas. Hydrogen is the presently preferred fuel gas, but other gases may be used such as methane, ethane, propane or acetylene, or mixtures thereof. The preferred oxidizing gas is oxygen or an oxide of nitrogen such as $N_2O$. The inert gas in each chamber may be argon or helium or a mixture thereof.

The block 1 defines a first substantially circular sectioned passage 5 which extends from a central region of the block to a mounting boss 6. The open mouth 7 of the gas chamber 3 is connected to the boss 6. The first passage 5 has, adjacent its end, one or more radially inwardly deflected tangs 8 which serve to reduce the diameter of the passage 5. A closure 9 is provided extending across the end face of the mounting boss 6 and effectively closing the passage 5. The closure may be a rigid plate, or may be an element of foil or the like. The closure 9 forms a gas-tight seal between the interior of the gas chamber 3 and the passage 5. The gas chamber 3 is provided with a filling aperture 10 by means of which the chamber 3 may be filled after the chamber has been secured to the central block or housing 1.

A gas flow passage 11 is defined within the block or housing 1 which extends, from the first passage 5, to an end face 12 of a boss 13 that is provided on the mounting block or housing 1, the boss 13 being adapted to be connected to an air-bag 14.

A second substantially circular sectioned passage 15 is provided, which, in this embodiment, is axially aligned with the first passage 5, which extends from the central region of the block or housing 1 to a connecting boss 16, to which is connected the open mouth 17 of the second gas chamber 4. The passage 15 is provided with at least one inwardly deflected tang 18 adjacent the end thereof so that the diameter of the passage is reduced. A closure 19 is provided which extends across the open end of the passage 15 at the end face of the boss 16 so as to form a gas-tight seal. The closure 19 may be rigid plate, on a foil. The closure 19 thus forms a gas-tight seal between the interior of the gas chamber 4 and the passage 15. The gas chamber 4 is provided with a filling aperture 20 so that the gas chamber 4 may be filled with gas after the gas chamber has been mounted on the block or housing 1.

The block or housing 1 defines a further gas flow passage 21 extending from the second passage 15 to the end face 12 of the boss 13.

As will be described hereinafter in greater detail, the igniter unit 2 is located in position in a seat provided for the purpose within the block or housing 1 which communicates with the central region between the two aligned passage 5, 15. The block or housing 1 also defines a further gas flow duct 22 which extends from the central region to the end face 12 of the boss 13.

Figure 2:
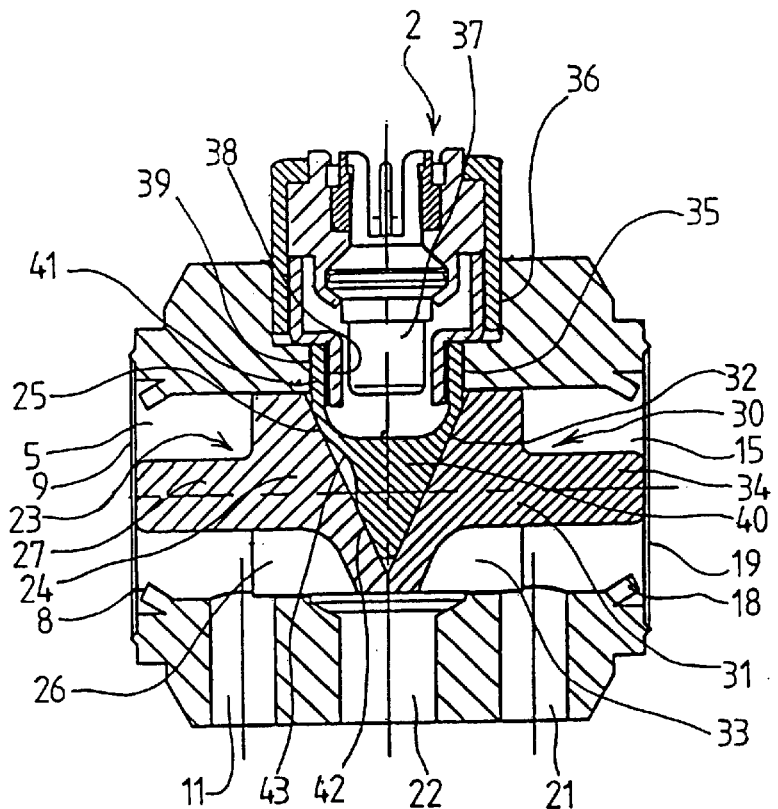
FIG. 2 is an enlarged view of part of the inflator of FIG. 1.
Figure 3:
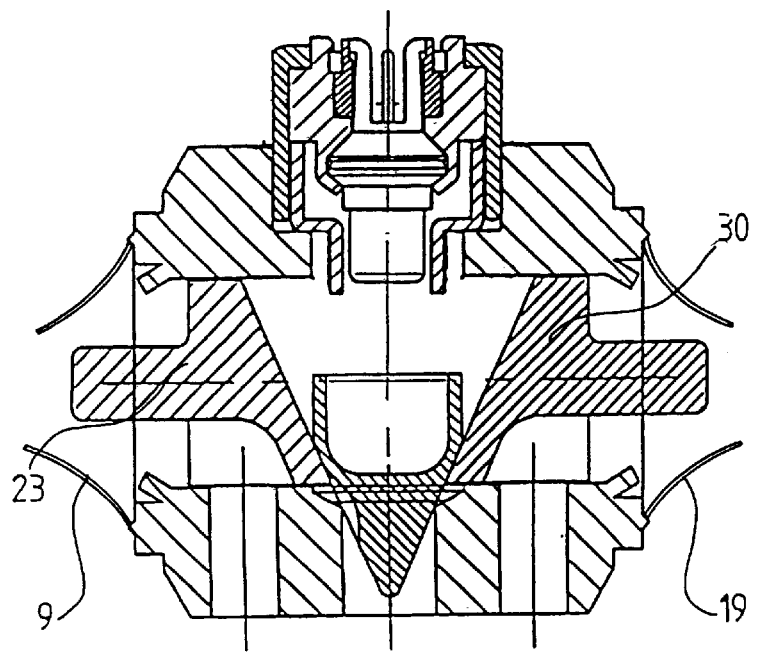
FIG. 3 is a view corresponding to FIG. 2 illustrating the position of components of the inflator after actuation of the inflator.

Contained within the first passage 5 is an opening element 23 which is shown more clearly in FIG. 2. The opening element 23 comprises an enlarged diameter head 24 which is a sliding fit within the passage 5, the head 24 having an end face 25 which is inclined relative to the axis of the passage. The lower-most part of the head 24 is provided with a cut-out 26 at a region adjacent the inner end of the gas flow duct 11. The head 24 carries an axially extending shaft 27 which extends axially of the passage 5 and which engages the central part of the closure 9. If the closure 9 is a foil, the end part of the shaft 27 will support the foil, and thus the integrity of the closure is maintained.

Contained within the second passage 15 is an opening element 30 which is of the same design, although mirror-image, as the opening element 23. Thus the opening element 30 has a head 31 which is a sliding fit within the second passage 15, and that head has an inclined end face 32 which is inclined relative to the axis of the passage 15. The two inclined end faces 25 and 32, as shown in FIG. 2, have a substantially "V" relative configuration.

The head 31 is provided with a cut-out 33 adjacent the open end of the gas flow passage 21, and the head 31 carries an axially extending shaft 34 which extends axially of the passage 15 and which contacts the closure 19. Again, if the closure 19 is of foil, the end of the axially extending shaft 34 will support the foil, and thus the integrity of the closure is maintained.

In the initial condition, as shown in FIG. 2, the two opening elements 23 and 30 contact each other in the central region of the support block or housing 1, with the lower-most edges of the inclined faces 25 and 32 abutting.

The igniter 2 is mounted in part of the housing 1 which is diametrically opposed to the gas duct 22. The igniter 2 is an electrically pyrotechnic igniter, adapted to emit hot gas. A first bore 35 communicates with the central part of the block or housing 1 where the two passages 5 and 15 merge, this bore of first diameter communicating with a second axially aligned bore 36 of greater diameter, thus defining a step or seat. The igniter 2 is inserted into the bore 36 of larger diameter, so that part of the igniter abuts the step or seat. The gas-emitting part 37 of the igniter 2 is located within the bore 35 of lesser diameter, but is separated from the bore wall by a ring 38, which may provide protection from flame. The ring 38 and the wall of the bore 35 together define an annular passage 39, which has an axis perpendicular to the co-aligned axes of the passages 5 and 15.

An actuating element 40 is provided which is of generally conical form, the base of the cone being provided with an axially extending skirt 41. The skirt is received within the annular space 39. The main body of the actuating element 40 defines a conical exterior 42, that conical exterior being provided with a plurality of recesses or cut-outs 43, which may be evenly spaced circumferentially around the conical surface. The apex angle of the conical surface 42 is the same as the relative angle of inclination between the inclined end faces 25 and 32 of the opening elements 23 and 30. The axis of the actuating element is perpendicular to the co-aligned axes of the passages 5 and 15.

It is to be appreciated that the central unit or housing 1 will first be fabricated initially, and the closure elements 9 and 19 will be located in position, and then the gas chambers 3 and 4 will be mounted on the central block or housing 1, and finally the gas bottles will be filled with the appropriate gas through the filling apertures 10 and 20, and those filling openings will then be sealed. An air-bag, such as the air-bag 14 may be connected appropriately to the boss 13.

When the air-bag is to be deployed, an appropriate electric signal is forwarded to the igniter 2, and a pyrotechnic charge within the igniter 2 is ignited, generating hot gas which emerges from the part 37 of the igniter 2, which is located within the hollow skirt 41 of the actuator 40. The gas will cause the actuator 40 to move. The actuator 40 can only move in a direction in alignment with the axis of the co-aligned bores 35 and 36, due to the fact that the axially extending skirt 41 is trapped within the annular passageway 39.

As the actuator 40 moves in this predetermined direction, the conical exterior 42 of the actuator 40 engages the inclined faces 25 and 32 of the opening elements 23 and 30. The inclined faces 25 and 32 and the exterior of the conical actuator are all inclined relative to the axes of the passages 5 and 15. The actuator 40 provides a wedging effect, and thus the opening element 23 moves towards the left as shown in FIG. 2, which forces the shaft 27 against the closure 9. If the closure 9 is of foil, the foil will be ruptured, and if the closure 9 is a rigid disc, the closure 9 will be driven away from the end of the mounting boss 6. Simultaneously, the opening element 30 will be driven towards the right as shown in FIG. 2, with a similar effect on the closure 19.

As the opening element 23 moves towards the left, the cut-out 26 becomes aligned with the gas flow duct 11 so that the gas flow duct 11 is not inadvertently sealed by the head 24 of the opening element 23. Thus, gas from the gas chamber 3 can flow past the now open closure 9, through the end part of the passage 5, through the cutout 26 and through the gas flow duct 11.

It will be understood, of course, that, similarly, as the opening element 30 moves to the right as shown in FIG. 2, gas from the gas chamber 4 will flow past the open closure 19, through the end part of the passage 15, through the cut-out 33 and through the gas flow duct 21. As the actuator is constrained to move in a predetermined direction, especially by the skirt 41 which is engaged in the recess 39, both opening elements 23, 30 move simultaneously thus opening the two gas chambers 3, 4, simultaneously.

Thus, very shortly after actuation of the igniter, gas from both of the gas chambers 3 and 4 will be flowing in the air-bag 14 commencing inflation of the air-bag.

As the actuating element 40 continues to move in a direction parallel with the axes of the bores 35 and 36, the skirt 41 will become disengaged from the annular passage 39. Gas from the igniter 20 will then fill the space between the inclined faces 25, 32 of the opening elements 23, 30. The actuating element 40 will, however, continue to move downwardly, due to the pressure of gas generated by the igniter 2. The opening elements 23 and 30 will continue to move apart although, eventually, movement of the opening elements will be restricted when the head 24 of the opening element 23 engages the tangs 8, and when the head 31 of the opening element 30 engages the tangs 18.

As the opening elements 23 and 30 move away from each other, the opening elements move away from the end of the gas flow duct 22 which communicates with the aligned passages 5 and 15. The conical surface 42 of the actuator 40 will move into the end part of the gas flow duct 22. Because the conical member is conical, and the inclined end faces 25 and 32 of the opening elements 23 and 30 are planar inclined faces, gas from the igniter 2 will then be able to flow past the actuating element 40 and through the gas flow duct 22 into the inflating air-bag 14. The hot gas from the igniter 2 will actually ignite the flammable gas mixture that now exists within the air-bag 14.

This ignition of the flammable gas mixture will occur a predetermined time after the gas bottles 3 and 4 are opened. The cut-out or recessed areas 43 provided in the conical surface 42 of the actuating element 40, may assist the flow of gas past the actuating element 40 into the gas flow duct 22. If the surface were a perfect conical surface, there would be a risk that the conical surface would form a seal at the upper end of the gas flow duct 22.

Whilst, in the described embodiment, two gas chambers 3 and 4 are provided, it is to be appreciated that in a modified embodiment, a greater number of gas chambers could be provided, and thus there could be three or even more gas chambers. If three gas chambers are provided, three equi-angularly spaced channels corresponding to the channels 5 and 15 will be provided, each containing a respective opening element.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An inflator for an air-bag, the inflator comprising a first gas chamber for containing a first gas, and a second gas chamber for containing a second gas, each gas chamber being mounted on a central block or housing, the central block or housing defining gas flow passages leading from each gas chamber to direct gas to an air-bag, each passage initially being closed by a closure, the block or housing containing an opening element associated with each closure, adapted to move from an initial position in which integrity of the associated closure is maintained to a final position in which the associated closure is opened, there being an igniter to generate hot gas, and an actuating element adapted to be moved in response to the generation of the hot gas, means being provided to constrain the actuating element to move in a predetermined direction over at least part of its movement, the actuating element acting upon the opening elements to move the opening elements substantially simultaneously to open the closures to permit (1) gas to flow from the gas chambers through the gas flow passages, (2) movement of the actuating element and the opening elements over a predetermined distance, and (3) opening a further gas flow path to permit gas from the igniter to flow through the further gas flow path into the air-bag.

2. An inflator according to claim 1 wherein said gas flow passages comprises two gas flow passages, each passage extending from a central part of the block or housing to a respective one of said closures, each passage containing a respective one of said opening elements, the actuating element being adapted, on movement in response to the generation of hot gas, to engage and act on part of each of said opening elements to cause the opening elements to move substantially simultaneously to open the closures.

3. An inflator according to claim 2 wherein each opening element comprises a head defining an end face and wherein the actuating element includes surfaces adapted to engage with said end faces, either the end faces or the surfaces, or both the end faces and the surfaces, being inclined with respect to axes of the passages to provide a wedging effect.

4. An inflator according to claim 3 wherein the head of each opening element is provided with an inclined planar face, and the actuating element is of substantially conical form.

5. An inflator according to claim 4 wherein the conical form of the actuating element is provided with a plurality of cut-outs.

6. An inflator according to claim 2 wherein a separate respective gas flow duct is provided extending from each of said passages to form a gas flow path from each passage to the interior of the air-bag.

7. An inflator according to claim 1 wherein the actuating element is provided with an axially extending skirt, the axially extending skirt initially being received in an annular passage, the skirt and the annular passage co-operating to constrain the actuating element to move in said predetermined direction.

8. An inflator according to claim 1 wherein the first gas chamber contains an oxidisable gas, alone or in admixture with an inert gas, and wherein the second gas chamber contains an oxidising gas, alone or in combination with an inert gas.

9. An inflator according to claim 8 wherein the oxidisable gas is methane, ethane, propane, acetylene, hydrogen or mixtures thereof.

10. An inflator according to claim 8 wherein the oxidising gas is oxygen or an oxide of nitrogen.

11. An inflator according to claim 8 wherein each inert gas is argon or helium or a mixture thereof.

12. An inflator according to claim 1 wherein each closure is in the form of a breakable foil.

* * * * *